(12) United States Patent
Tang

(10) Patent No.: US 11,963,512 B1
(45) Date of Patent: Apr. 23, 2024

(54) PET TOILET

(71) Applicant: PETPIVOT INC, Portland, OR (US)

(72) Inventor: Tieqiang Tang, Shaoyang (CN)

( * ) Notice: Subject to any disclaimer, the term of this patent is extended or adjusted under 35 U.S.C. 154(b) by 0 days.

(21) Appl. No.: 18/457,290

(22) Filed: Aug. 28, 2023

(30) Foreign Application Priority Data

Aug. 18, 2023   (CN) .......................... 202322241189.0

(51) Int. Cl.
*A01K 1/01* (2006.01)
(52) U.S. Cl.
CPC .................................. *A01K 1/0114* (2013.01)
(58) Field of Classification Search
CPC .... A01K 1/0114; A01K 1/011; A01K 1/0107; A01K 1/0125; A01K 23/005; A01K 1/0117; A01K 31/04; B07B 1/22; B07B 1/18; B07B 13/16; B07B 1/24; B07B 4/06
USPC ........ 119/165, 161, 462; 209/288, 270, 406, 209/369
See application file for complete search history.

(56) References Cited

U.S. PATENT DOCUMENTS

| 2021/0267158 A1* | 9/2021 | Ma .......................... A01K 1/011 |
| 2022/0142114 A1* | 5/2022 | Baxter ................. A01K 1/0114 |
| 2023/0103710 A1* | 4/2023 | Fan ...................... A01K 1/0146 119/166 |

FOREIGN PATENT DOCUMENTS

| CN | 114793917 A | * | 7/2022 |
| CN | 115623990 A | * | 1/2023 |

* cited by examiner

*Primary Examiner* — Peter M Poon
*Assistant Examiner* — Jeffrey R Larsen

(57) ABSTRACT

The present disclosure discloses a pet toilet. The pet toilet includes a base and a litter bin rotatably arranged on the base. The base is provided with a collection chamber. A first opening is formed in a position, corresponding to the collection chamber of the base. A baffle plate is movably arranged at the first opening of the base; the litter bin is provided with a first joint portion. The baffle plate is provided with a second joint portion used in conjunction with the first joint portion. The litter bin is provided with a pushing member. The baffle plate is configured to be pushed when the litter bin rotates relative to the base by the pushing member and is lifted upwards relative to the base in the pushing process. The first joint portion is configured to be embedded with the second joint portion when the baffle plate is lifted upwards.

17 Claims, 19 Drawing Sheets

PET TOILET

CROSS-REFERENCE TO RELATED APPLICATIONS

The application claims priority of Chinese patent application CN2023222411890, filed on Aug. 18, 2023, which is incorporated herein by reference in its entireties.

TECHNICAL FIELD

The present disclosure relates to the technical field of pet supplies, and in particular, to a pet toilet.

BACKGROUND

In order to facilitate the handling of pets' waste and prevent the stink of the waste, intelligent litter pots have been introduced on the current market. The intelligent litter box includes a base and a litter bin. The base is internally provided with a collection tank configured to collect waste, and a top of the base is provided with an opening that is in communication with the collection tank; and a baffle plate is arranged at the opening. The litter bin rotates relative to the base. When the litter bin rotates, a sieve in the litter bin can sift litter and waste. The baffle plate may rotate to open the opening, so that the waste may fall into the collection tank from the opening on the litter bin and the opening on the base. After this action is completed, the litter bin rotates in an opposite direction to be reset, and the baffle plate is reset under its own gravity to block the opening on the base. However, in this way, the stability of rotation of the baffle plate is poor. Furthermore, the baffle plate is easily stuck by dust and debris in the resetting process under the gravity of the baffle plate itself, which affects the resetting of the baffle plate and the usage effect of the intelligent litter box.

SUMMARY

The present disclosure mainly aims to provide a pet toilet, which is used to solve the problems that a baffle plate on an existing litter box is poor in stability of rotation and is easily stuck by dust and debris, affecting resetting.

In order to solve the above technical problem, the technical solution of the present disclosure is as follows:

A pet toilet includes a base and a litter bin rotatably arranged on the base. The base is provided with a collection chamber; a first opening is formed in a position, corresponding to the collection chamber, of the base; a baffle plate is movably arranged at the first opening of the base; the litter bin is provided with a first joint portion; the baffle plate is provided with a second joint portion used in conjunction with the first joint portion; the litter bin is provided with a pushing member; the baffle plate is configured to be pushed, when the litter bin rotates relative to the base, by the pushing member and is lifted upwards relative to the base in the pushing process; and the first joint portion is configured to be embedded with the second joint portion when the baffle plate is lifted upwards.

In one embodiment, a surface of the base is inwards sunken to form a concave groove; and at least part of the baffle plate is arranged in the concave groove when the baffle plate is at an initial position.

In one embodiment, a bottom of the baffle plate is rotatably provided with first rollers at two ends of the first opening, and at the initial position, at least part of each of the first rollers is arranged in the concave groove.

In one embodiment, a side wall of the concave groove is a first guide surface.

In one embodiment, the first joint portion is a first rack, and the second joint portion is a second rack; and the first rack is engaged with the second rack.

In one embodiment, the base is provided with a driving mechanism connected to the litter bin and configured to drive the litter bin to rotate.

In one embodiment, the litter bin is in a drum shape, and a rear end surface of the litter bin is provided with a first gear; an upper surface of the base is sunken downwards to form an avoiding groove that is matched with the litter bin; first supporting slots matched with the litter bin are formed in a front side wall and a rear side wall of the avoiding groove; the driving mechanism includes a motor and a second gear connected to the motor; the second gear is located on the first supporting slot on the rear side wall of the avoiding groove; the second gear is engaged with the first gear; the litter bin rotates through the second gear when the motor drives the first gear to rotate; the first joint portion is located on the rear end surface of the litter bin; the rear end surface of the litter bin protrudes backwards; and the second joint portion is located below the first gear and behind the rear end surface of the litter bin.

In one embodiment, a second opening is formed in a side wall of the litter bin; there is one pushing member; the pushing member is formed by protruding outwards from the rear end surface of the litter bin and is located at one end of the first joint portion; a side surface, away from the first gear, of the pushing member is located between the outer side wall of the litter bin and the side surface, away from the first gear, of the first joint portion; or, the pushing member is formed by protruding outwards from the side wall of the litter bin and is located next to the second opening.

In one embodiment, there are a plurality of pushing members; at least one pushing member is formed by protruding outwards from the rear end surface of the litter bin and is located at one end of the first joint portion, and a side surface, away from the first gear, of the pushing member is located between the outer side wall of the litter bin and the side surface, away from the first gear, of the first joint portion; and at least one pushing member is formed by protruding outwards from a side wall of the litter bin and is located next to the second opening.

In one embodiment, a bottom surface of the first supporting slot located on the front side wall of the avoiding groove is rotatably provided with a plurality of second rollers spaced apart from each other.

In one embodiment, the base is provided with a support plate behind the avoiding groove; a second supporting slot is formed in the support plate; a bottom surface of the second supporting slot is rotatably provided with a plurality of third rollers spaced apart from each other; a convex column is arranged on the rear end surface of the litter bin; the convex column is located in the middle of the first gear; an annular groove is formed in an outer side wall of the convex column; and some of the third rollers are arranged in the annular groove.

In one embodiment, the litter bin includes a bin body and an integral partition plate arranged in the bin body; the first joint portion, the first gear, the pushing member, and the second opening are all located on the bin body; and the integral partition plate forms a receiving slot with an inner wall of the bin body and is integrally molded with the bin body.

In one embodiment, the bin body includes a first housing and a second housing connected to the first housing; the integral partition plate includes a first partition plate integrally molded with the first housing, and a second partition plate integrally molded with the second housing; and the first partition plate and the second partition plate form the integral partition plate when the first housing is connected to the second housing.

In one embodiment, a first joint structure is arranged between the first partition plate and the second partition plate.

In one embodiment, a sifter located next to the integral partition plate is further arranged in the bin body; two end surfaces of the sifter protrude outwards to form insertion blocks; insertion slots are formed in two internal end surfaces of the bin body; the insertion blocks are arranged in the insertion slots; the inner wall of the bin body protrudes on one side of the notch of the receiving slot to form a first limiting block; and the sifter is located between the first limiting block and the integral partition plate.

In one embodiment, a removable basin body provided with a third opening in a top is arranged in the bin body; the inner wall of the bin body protrudes out of a circumferential side of the basin body to form a plurality of clamping blocks configured to limit the basin body; and the first limiting block is a clamping block.

In one embodiment, a second joint structure is arranged between the first housing and the second housing; one side, close to the second housing, of the first housing protrudes to form a plurality of first connecting lug seats; one side, close to the first housing, of the second housing protrudes to form a plurality of second connecting lug seats; the first connecting lug seats are connected to the second connecting lug seats through screws; the second connecting lug seats are located on outer sides of the first connecting lug seats and are provided with counter bores in positions corresponding to the screws; and plugs are arranged in the counter bores.

In one embodiment, a bottom of the base is detachably provided with a collection basin, and the collection chamber is located on the collection basin.

In one embodiment, two sides of a top of the collection basin outwards extend to form second insertion blocks; sliding chutes used in conjunction with the insertion blocks are formed in the bottom of the base; and the second insertion blocks are arranged in the sliding chutes.

In one embodiment, the bottom of the base is further provided with a plurality of support legs located on the circumferential side of the collection basin; and a bottom surface of the collection basin is located above bottom surfaces of the support legs.

The present disclosure has the following beneficial effects: Compared with the prior art, the present disclosure uses a first joint portion to be embedded with a second joint portion after a pushing member pushes a baffle plate to move and the baffle plate is lifted in the moving process, so that a contact area between a litter bin and the baffle plate can be effectively enlarged, and a thrust surface of the baffle plate is enlarged, so as to effectively improve the stability of movement of the baffle plate.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those ordinarily skilled in the art without doing creative work shall fall within the protection scope of the present disclosure.

Referring to FIG. 1 to FIG. 19, a pet toilet in the embodiments of the present disclosure is shown.

Figure 1:
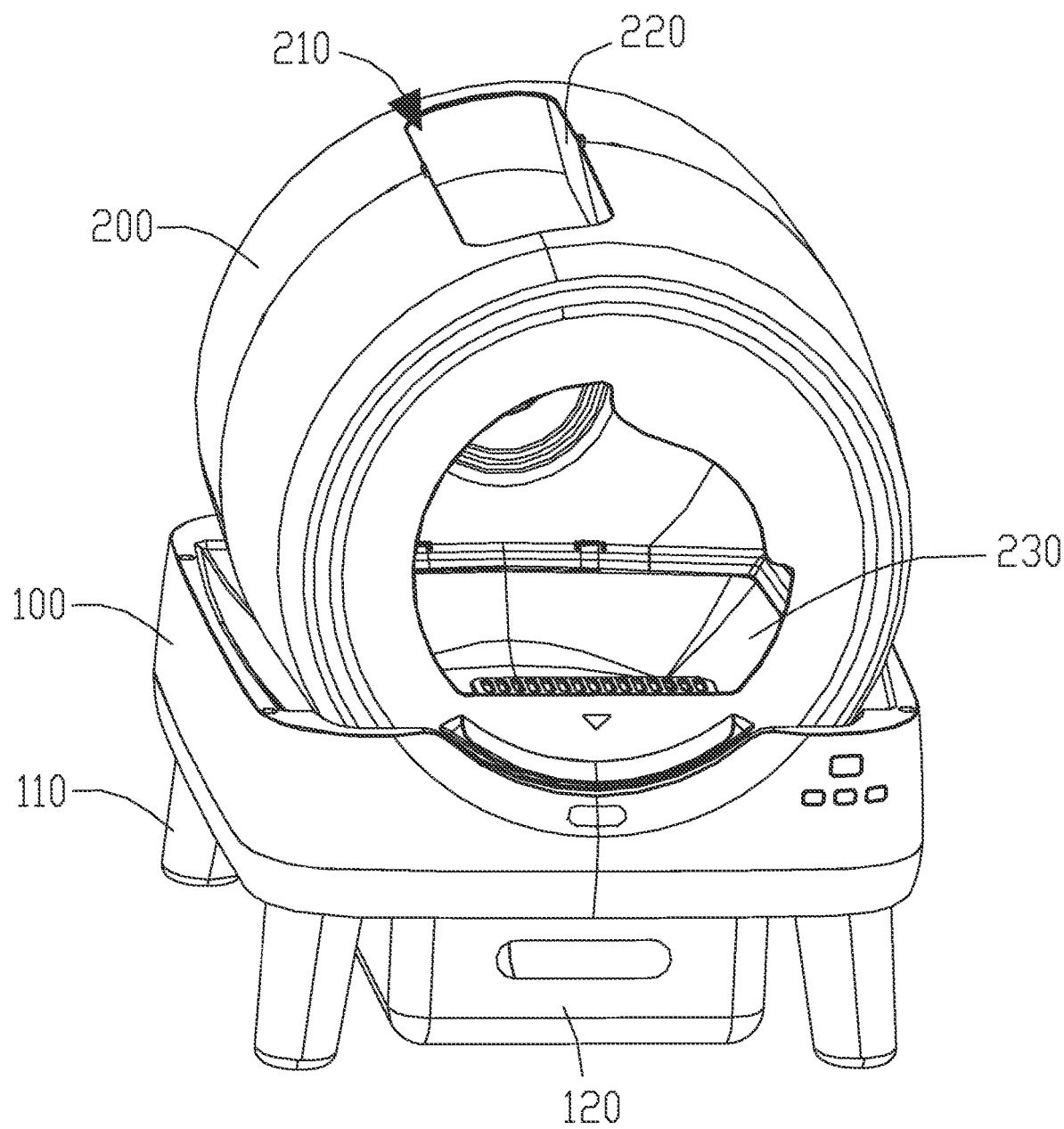
FIG. 1 is a three-dimensional diagram of the present disclosure.
Figure 2:
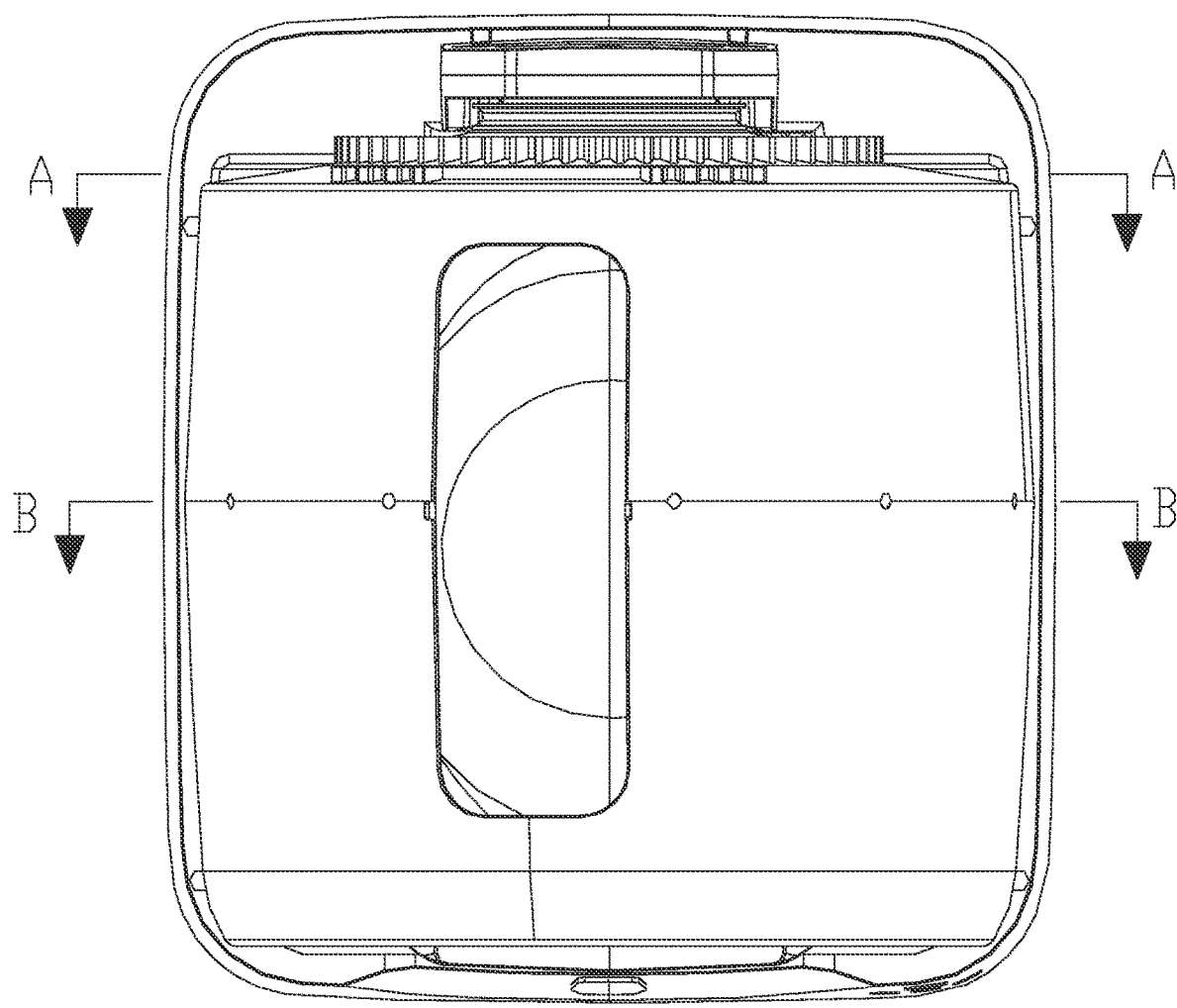
FIG. 2 is a top view of the present disclosure.
Figure 3:
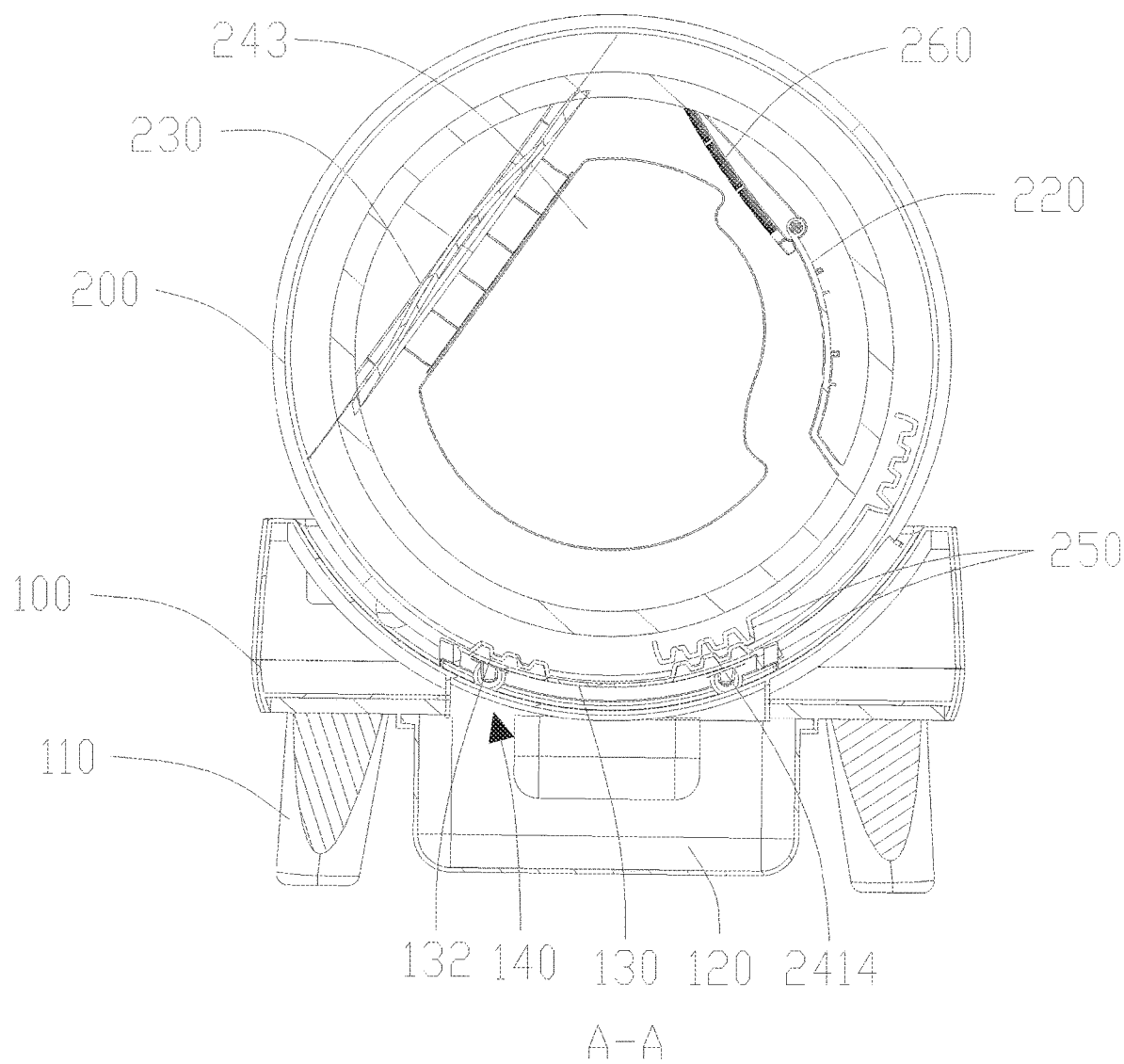
FIG. 3 is a cutaway view of the present disclosure along the direction A-A in FIG. 2.

Referring to FIG. 1 to FIG. 3, the pet toilet includes a base 100, and a litter bin 200 rotatably arranged on the base 100. The base 100 is provided with a collection chamber 121. A first opening 140 is formed in a position, corresponding to the collection chamber 121, of the base 100. A baffle plate 130 is movably arranged at the first opening 140 of the base 100. The litter bin 200 is provided with a first joint portion 2414. The baffle plate 130 is provided with a second joint portion 132 used in conjunction with the first joint portion 2414. The litter bin 200 is provided with a pushing member 250. The baffle plate 130 is configured to be pushed, when the litter bin 200 rotates relative to the base 100, by the pushing member 250 and is lifted upwards relative to the base 100 in the pushing process. The first joint portion 2414 is configured to be embedded with the second joint portion 132 when the baffle plate 130 is lifted upwards.

In this embodiment, the first joint portion 2414 and the second joint portion 132 used in conjunction with the first joint portion 2414 are respectively configured on the litter bin 200 and the baffle plate 130. Furthermore, after the litter bin 200 rotates a certain angle, the pushing member 250 is used to push the baffle plate 130 to move, and the baffle plate 130 is lifted in the moving process, so that the first joint portion 2414 and the second joint portion 132 are embedded to achieve aligned connection between the baffle plate 130 and the litter bin 200 and achieve that the baffle plate 130 rotates together with the litter bin 200. Therefore, the baffle plate 130 is moved away from the first opening 140 to open the first opening 140, so that sifted waste in the litter bin 200 falls into the collection chamber 121 via the first opening 140 to treat the waste of a pet. Furthermore, when the litter bin 200 rotates reversely, the first joint portion 2414 and the second joint portion 132 are embedded, so that the baffle plate 130 can stably rotate to an initial position along with the litter bin 200. Meanwhile, after the baffle plate 130 returns to the initial position, the baffle plate 130 is lowered relative to the base 100, so that the first joint portion 2414 is separated from the second joint portion 132 to prevent the baffle plate 130 from continuing to rotate along with the litter bin 200 after moving to the first opening 140.

For this reason, the first joint portion 2414 and the second joint portion 132 are embedded, which can effectively enlarge a contact area between the litter bin 200 and the baffle plate 130, enlarge a thrust surface of the baffle plate 130, improve the stability of the back and forth movement of the baffle plate 130, and solve the problems that the baffle plate 130 on an existing intelligent litter box is poor in rotation stability and the resetting of the baffle plate under its gravity is easily affected by dust and fragments.

Figure 7:
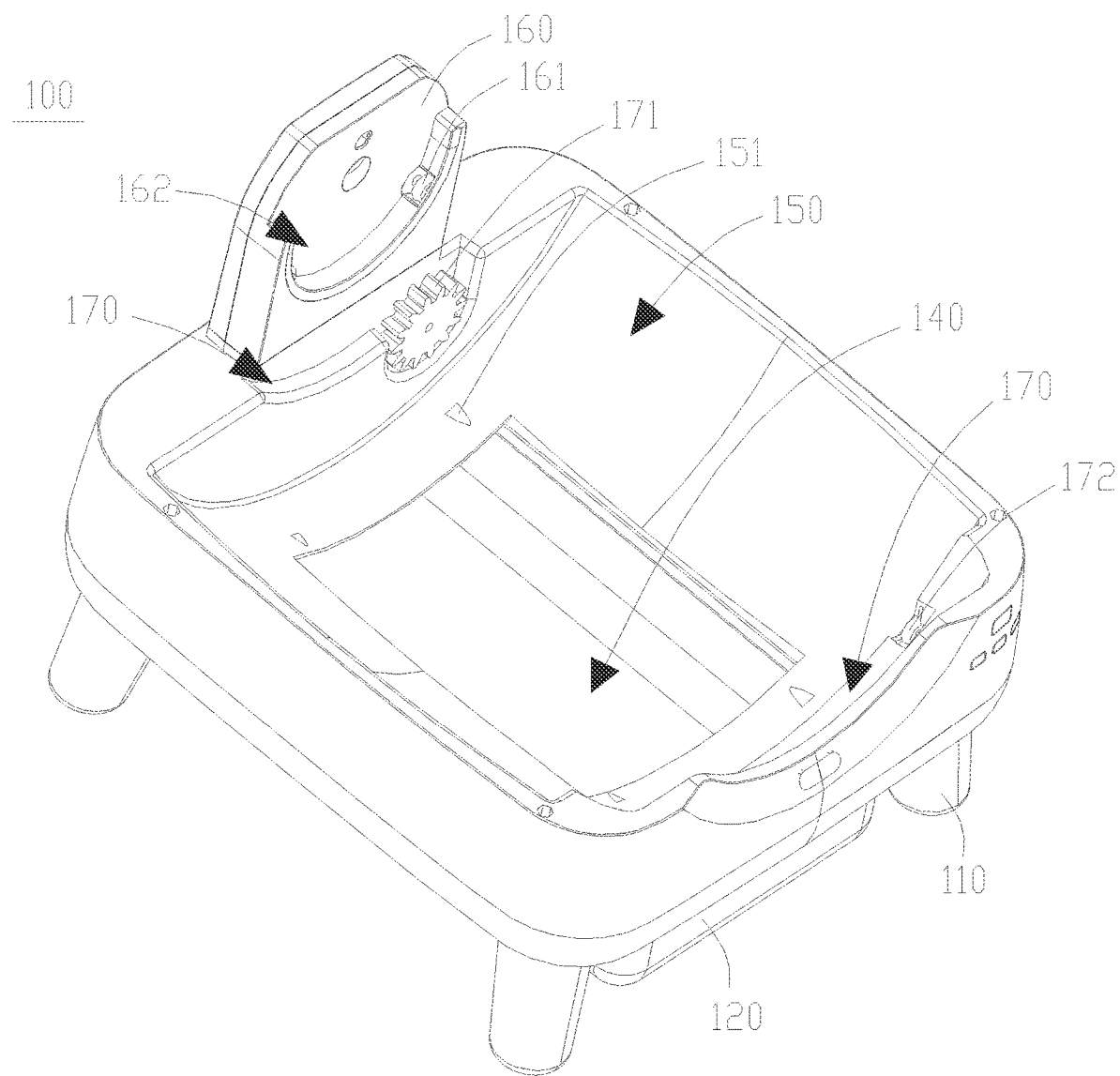
FIG. 7 is a structural diagram of a base of the present disclosure.

Specifically, in the above embodiments, referring to FIG. 7, a surface of the base 100 is inwards sunken to form a concave groove 151. At least part of the baffle plate 130 is arranged in the concave groove 151 when the baffle plate is at the initial position. For this reason, the baffle plate 130 is separated from the concave groove 151 under the pushing of the pushing member 250, so that the baffle plate 130 can be lifted to achieve that the first joint portion 2414 and the second joint portion 132 are embedded. Furthermore, after the waste of the pet falls into the collection chamber 121, the litter bin 200 reversely rotates to drive the baffle plate 130 to rotate together. The baffle plate 130 moves into the concave groove 151, which can separate the first joint portion 2414 from the second joint portion 132, so as to prevent the baffle plate 130 from continuing to move with the litter bin 200. In other embodiments, a bottom of the baffle plate 130 is rotatably provided with first rollers 131 at two ends of the first opening 140, and at the initial position, at least part of each of the first rollers 131 is arranged in the concave groove 151. This structure can also achieve that the baffle plate 130 is lifted in the moving process and achieve that the first joint portion 2414 and the second joint portion 132 are embedded.

In the above embodiment, a side wall of the concave groove 151 is a first guide surface. Through the guide effect of the first guide surface, when the baffle plate 130 is pushed by the pushing member 250, the first rollers 131 are more smoothly separated from the concave groove 151. Specifically, the first guide surface can be an inclined surface or a cambered surface.

Figure 6:
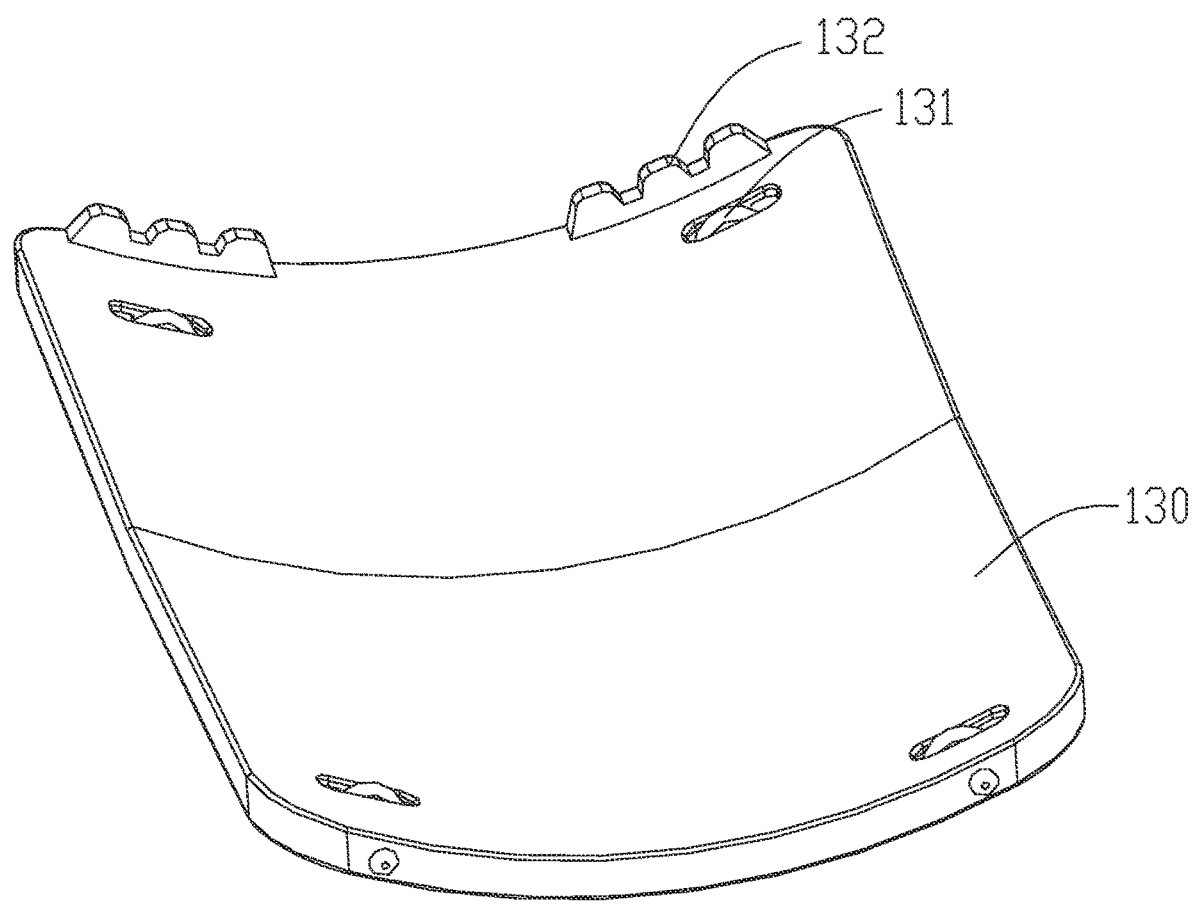
FIG. 6 is a structural diagram of a baffle plate of the present disclosure.
Figure 10:
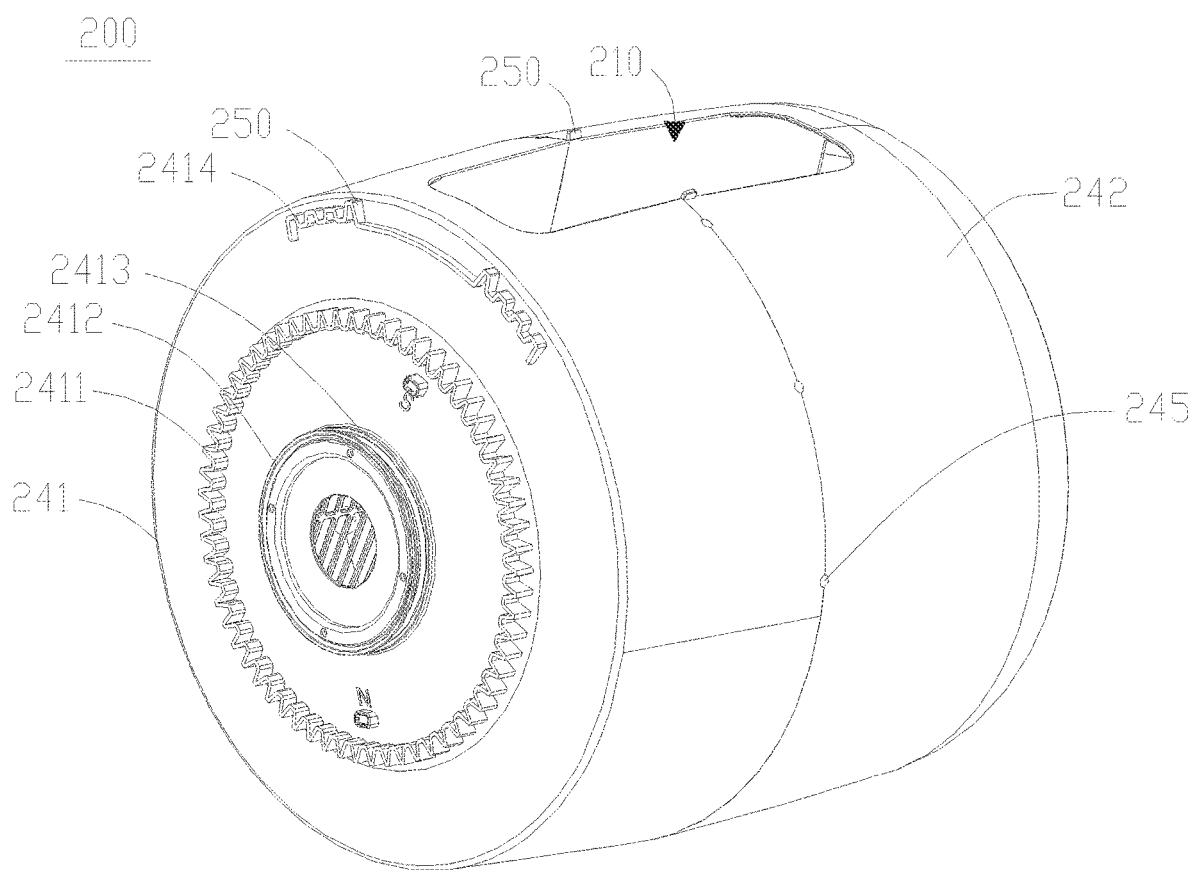
FIG. 10 is a three-dimensional diagram of a litter bin of the present disclosure.
Figure 11:
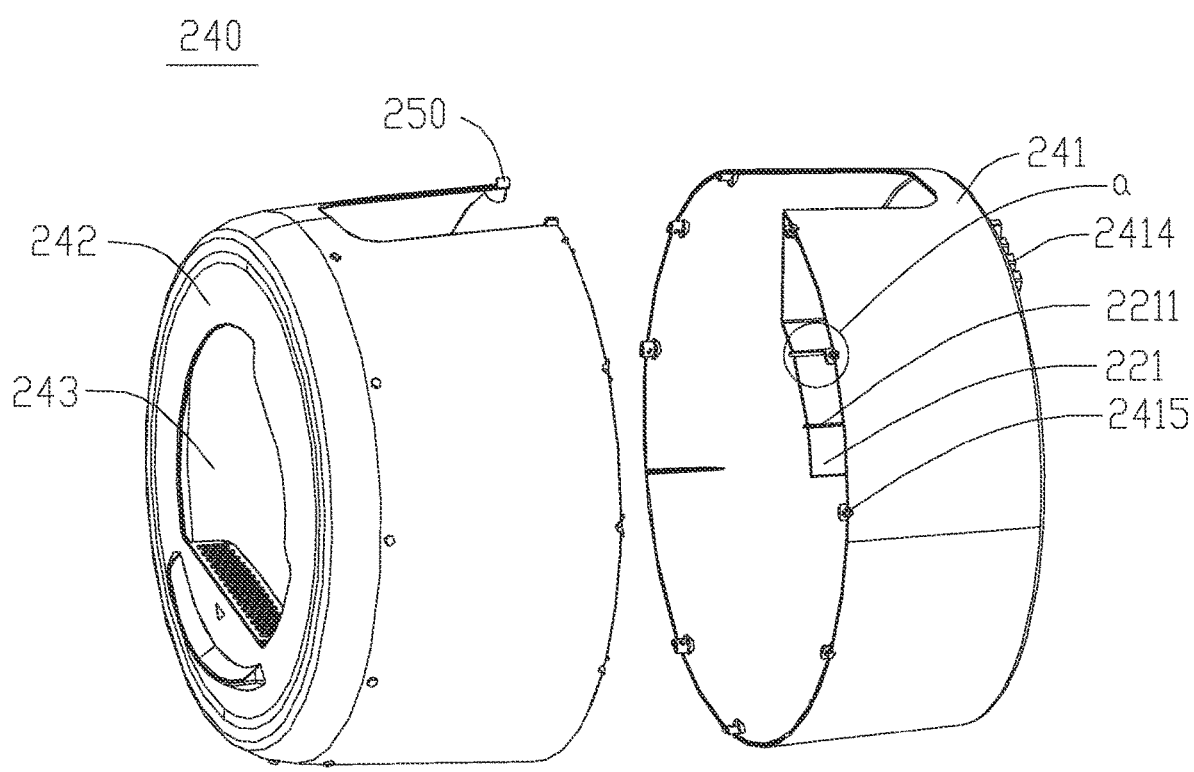
FIG. 11 is an exploded diagram of a bin body of the present disclosure.
Figure 12:
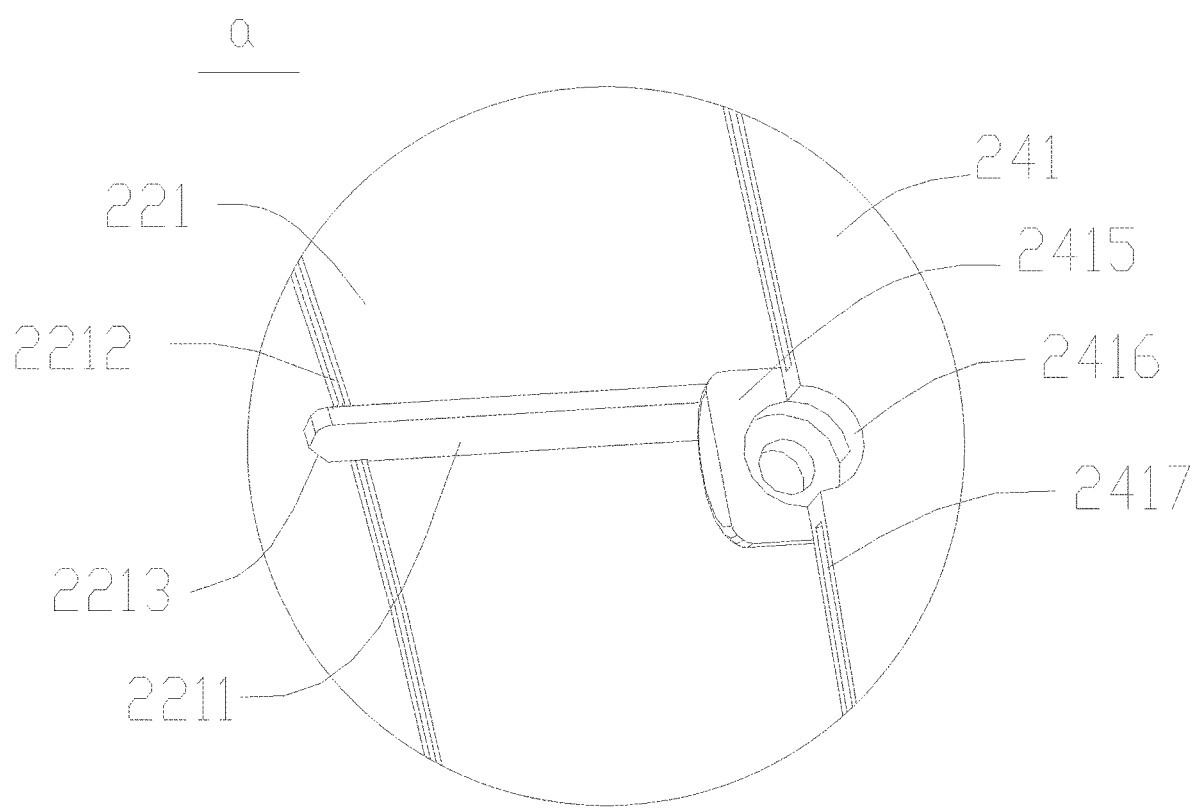
FIG. 12 is an enlarged diagram of the region a in FIG. 11.
Figure 13:
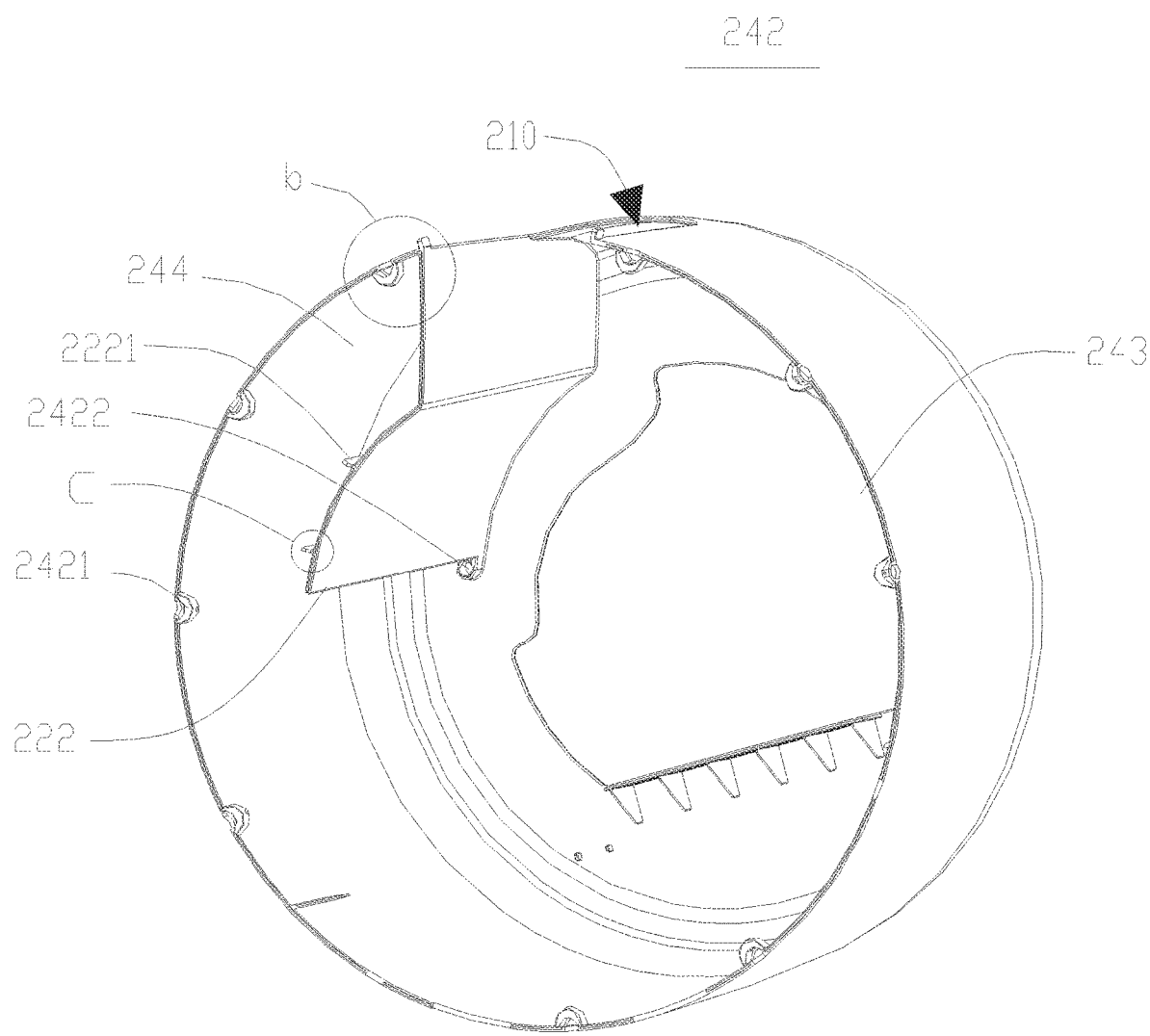
FIG. 13 is a structural diagram of a first housing of the present disclosure.
Figure 14:
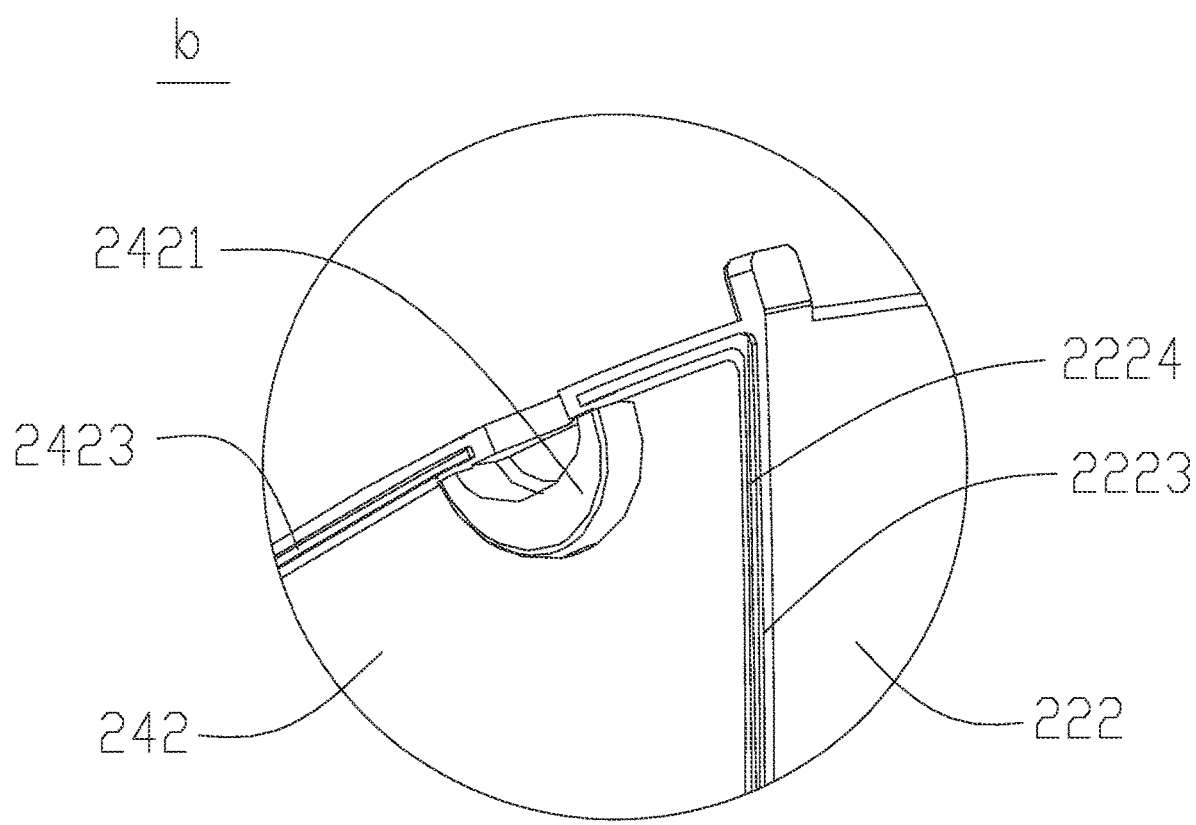
FIG. 14 is an enlarged diagram of the region b in FIG. 13.
Figure 15:
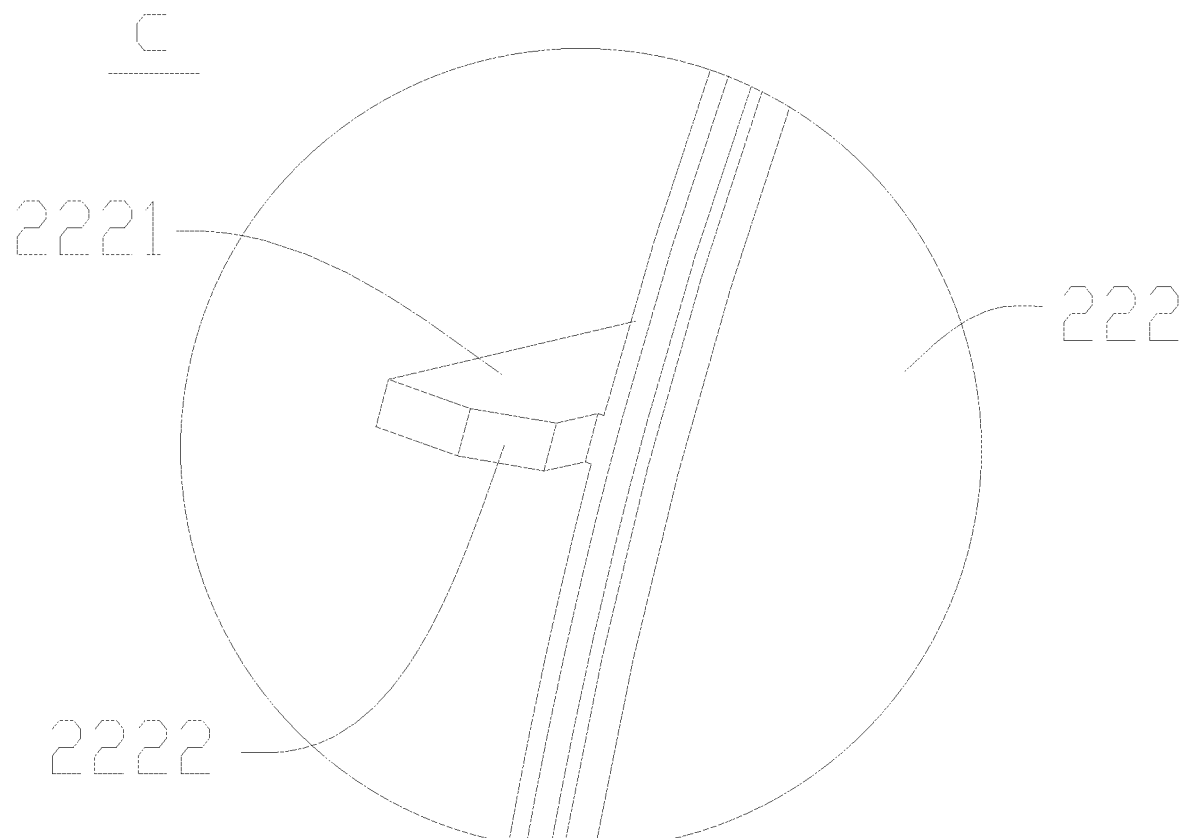
FIG. 15 is an enlarged diagram of the region c in FIG. 13.

In the above embodiment, referring to FIG. 6 and FIG. 10, the first joint portion 2414 is a first rack, and the second joint portion 132 is a second rack. The first rack is engaged with the second rack, and a plurality of teeth on both the first rack and the second rack are engaged to effectively enlarge the contact area between the baffle plate 130 and the litter bin 200, thereby improving the stability of the movement of the baffle plate 130. In other embodiments, the first joint portion 2414 may be sunken inwards to form several slots, and the second joint portion 132 may be a convex block formed by outward protrusion. Or, the second joint portion 132 is a slot, and the first joint portion 2414 is a convex block. They can also achieve embedding. The structure of the first joint portion 2414 and the structure of the second joint portion 132 are not limited here.

Figure 8:
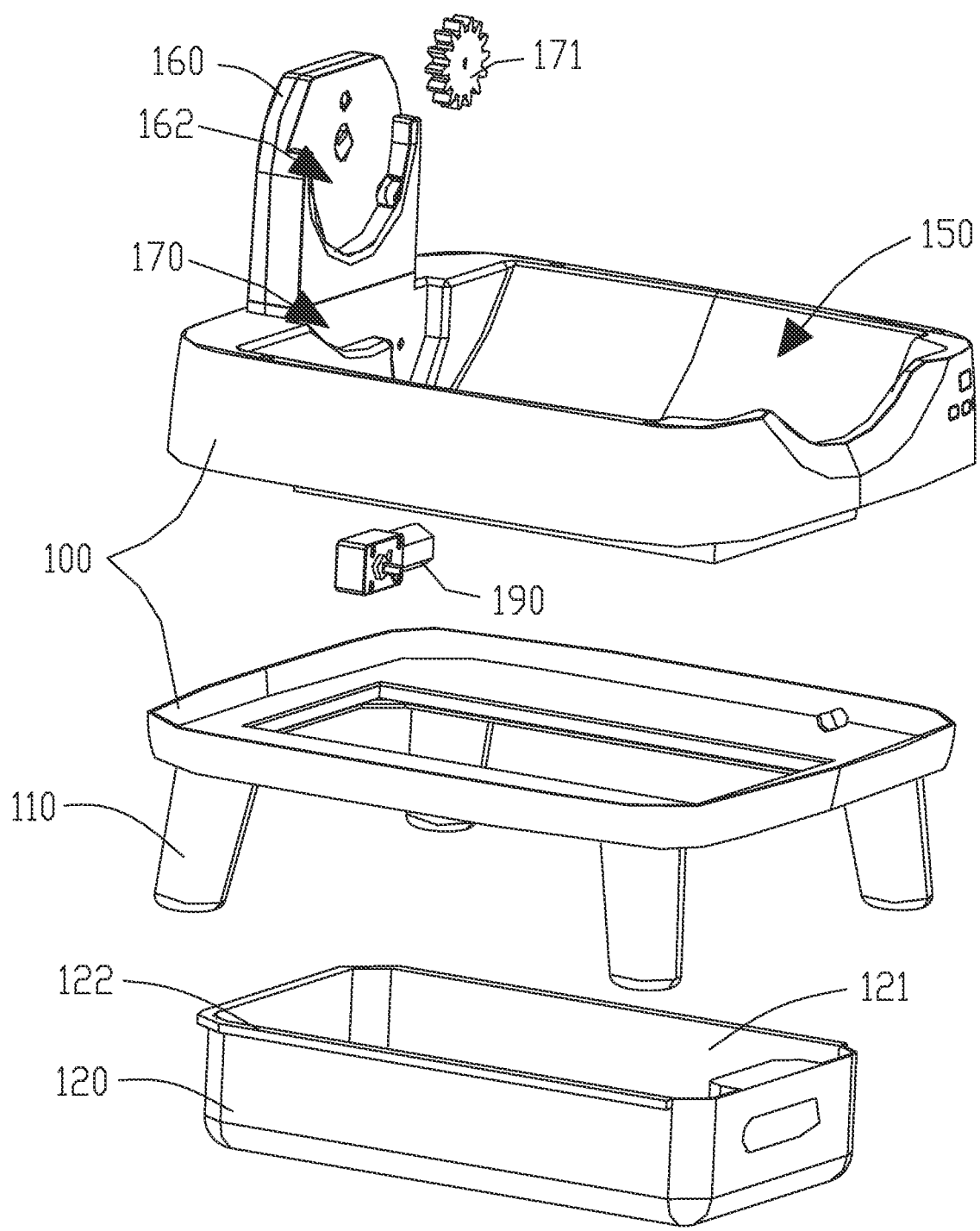
FIG. 8 is an exploded diagram of a base of the present disclosure.

In the above embodiment, referring to FIG. 8, the base 100 is provided with a driving mechanism connected to the litter bin 200 and configured to drive the litter bin 200 to rotate, so as to achieve the rotation of the litter bin 200. Of course, in other embodiments, the litter bin 200 can also be manually rotated.

Referring to FIG. 7 and FIG. 10, the litter bin 200 is in a drum shape, and a rear end surface of the litter bin 200 is provided with a first gear 2411. An upper surface of the base 100 is sunken downwards to form an avoiding groove 150 that is matched with the litter bin 200. It should be understood that a bottom surface of the avoiding groove 150 is a cambered surface. The concave groove 151 is located in the avoiding groove 150, and a radian of the bottom surface of the baffle plate 130 is the same as a radian of the bottom surface of the avoiding groove 150, so that when the litter bin 200 rotates and the first joint portion 2414 is embedded with the second joint portion 132, the baffle plate 130 can be driven to rotate together.

First supporting slots 170 matched with the litter bin 200 are formed in a front side wall and a rear side wall of the avoiding groove 150. The driving mechanism includes a motor 190 and a second gear 171 connected to the motor 190. The second gear 171 is located on the first supporting slot 170 on the rear side wall of the avoiding slot 150, and the second gear 171 is engaged with the first gear 2411. For this reason, the motor 190 can drive the second gear 171 to rotate. The litter bin 200 rotates through the first gear 2411. Furthermore, the first supporting slots 170 at the front and rear ends support the litter bin 200, so that the litter bin 200 can be located above the baffle plate 130 and is spaced apart from the baffle plate 130, to prevent the baffle plate 130 from being directly driven, when the litter bin 200 rotates, to move along the bottom surface of the avoiding groove 150.

The first joint portion 2414 is located on a rear end surface of the litter bin 200. The rear end surface of the litter bin 200 protrudes backwards. The second joint portion 132 is located below the first gear 2411 and behind the rear end surface of the litter bin 200. In this way, when the litter bin 200 rotates, it is possible to prevent the first joint portion 2414 and the second joint portion 132 from affecting the rotation of the litter bin 200. The first joint portion 2414 is located above the second joint portion 132. The pushing member 250 pushes the baffle plate 130 to move, and the baffle plate 130 is lifted after leaving the concave groove 151, so that the first joint portion 2414 is embedded with the second joint portion 132. When the litter bin 200 continues to rotate, the baffle plate 130 is driven to move along the bottom surface of the avoiding groove 150, so as to open the first opening 140.

In an embodiment, referring to FIG. 10, there is one pushing member 250. The pushing member 250 can be formed by protruding outwards from the rear end surface of the litter bin 200 and is located at one end of the first joint portion 2414. A side surface, away from the first gear 2411, of the pushing member 250 is located between an outer side wall of the litter bin 200 and a side surface, away from the first gear 2411, of the first joint portion 2414. When the first joint portion 2414 moves directly above the second joint portion 132, due to the fact that the pushing member 250 is relatively long, the pushing member 250 will continue to rotate with the litter bin 200 and resist against the second joint portion 132, and the baffle plate 130 is pushed to move through the second joint portion 132. Or, a second opening 210 is formed in a side wall of the litter bin 200, and the pushing member 250 is formed by protruding outwards from the side wall of the litter bin 200 and is located next to the second opening 210. During the rotation of the litter bin 200, the pushing member 250 may push the baffle plate 130 to move and open the first opening 140, so that the first opening 140 is opposite to the second opening 210, and it is convenient for the waste to fall into the collection chamber 121 through the first opening 140 from the second opening 210.

In other embodiments, there are a plurality of pushing members 250. At least one pushing member 250 is formed by protruding outwards from the rear end surface of the litter bin 200 and is located at one end of the first joint portion 2414, and a side surface, away from the first gear 2411, of the pushing member 250 is located between the outer side wall of the litter bin 200 and the side surface, away from the first gear 2411, of the first joint portion 2414. At least one pushing member 250 is formed by protruding outwards from the outer side wall of the litter bin 200 and is located next to the second opening 210. In this way, when the litter bin 200 rotates, the pushing member 250 located next to the first joint portion 2414 and the pushing member 250 next to the second opening 210 can push the baffle plate 130 to move together, which enlarges the contact area between the litter bin 200 and the baffle plate 130, enlarges the thrust surface of the baffle plate 130, and increases an acting force of the baffle plate, so as to better push the baffle plate 130. The stability of the movement of the baffle plate 130 can be improved by pushing the baffle plate 130.

In an embodiment, referring to FIG. 5 to FIG. 8, the bottom surface of the first supporting slot 170 located on the front side wall of the avoiding groove 150 is rotatably provided with a plurality of second rollers 172 spaced apart from each other. By use of the second rollers 172, a friction force during the rotation of the litter bin 200 can be reduced, allowing smoother rotation of the litter bin 200.

In an embodiment, the base 100 is provided with a support plate 160 behind the avoiding groove 150. A second supporting slot 162 is formed in the support plate 160. A bottom surface of the second supporting slot 162 is rotatably provided with a plurality of third rollers 161 spaced apart from each other. A convex column 2412 is arranged on the rear end surface of the litter bin 200. The convex column 2412 is located in the middle of the first gear 2411. An annular groove 2413 is formed in an outer side wall of the convex column 2412. Some of the third rollers 161 are arranged in the annular groove 2413. Due to cooperation between the third rollers 161 and the annular groove 2413, the stability of the rotation of the litter bin 200 can be improved.

In an embodiment, referring to FIG. 10 to FIG. 15, the litter bin 200 includes a bin body 240 and an integral partition plate 220 arranged in the bin body 240. The first joint portion 2414, the first gear 2411, the pushing member 250, and the second opening 210 are all located on the bin body 240. For this reason, the motor 190 can drive the bin body 240 to rotate. The integral partition plate 220 forms a receiving slot 244 with the inner wall of the bin body 240 and is integrally molded with the bin body 240. In this embodiment, the integral partition plate 220 and the bin body 240 are integrally molded, which can effectively simplify an assembly process of the integral partition plate 220, reduce the production procedures of the litter bin 200, and improve the production efficiency of the litter bin 200. In this way, there is no gap between the integral partition plate 220 and the litter bin 200, which can prevent pet litter maintained in a gap and facilitate cleaning of the litter bin 200.

In the above embodiment, to facilitate the production and manufacturing of the bin body 240, the bin body 240 includes a first housing 242 and a second housing 241 connected to the first housing 242. The integral partition plate 220 includes a first partition plate 222 integrally molded with the first housing 242, and a second partition plate 221 integrally molded with the second housing 241. The first partition plate 222 and the second partition plate 221 form the partition plate 220 when the first housing 242 is connected to the second housing 241. Specifically, the first housing 242 is a front half part of the bin body 240, and the second housing 241 is a rear half part of the bin body 240. The second opening 210 is formed by connecting the first housing 242 to the second housing 241. Both the first gear 2411 and the first joint portion 2414 are located on the second housing 241. Furthermore, the first housing 242 is provided with an inlet and outlet 243 for a pet to enter and leave the bin body 240. Of course, in other embodiments, the first housing 242 and the second housing 241 can also be a left half part and a right half part of the bin body 240.

In an embodiment, a first joint structure is arranged between the first partition plate 222 and the second partition plate 221. The first joint structure can improve the stability of the connection between the first partition plate 222 and the second partition plate 221 and narrow a clearance between the first partition plate 222 and the second partition plate 221.

In the above embodiment, the first joint structure includes a first embedding block 2223 and a first embedding slot 2212 used in conjunction with the first embedding block 2223. The first embedding block 2223 is arranged in the first embedding slot 2212 when the first housing 242 is connected to the second housing 241. Thus, a position between the first partition plate 222 and the second partition plate 221 can be limited.

Specifically, the first embedding block 2223 is formed by protruding from one side, opposite to the second partition plate 221, of the first partition plate 222; and the first embedding slot 2212 is located on the second partition plate 221. Or, the first embedding block 2223 is located on the second partition plate 221, and the first embedding slot 2212 is located on the first partition plate 222.

In an embodiment, second guide surfaces 2224 are formed on two sides of the first embedding block 2223 and two side walls of a notch of the first embedding slot 2212. The second guide surfaces 2224 are used for guidance, which can facilitate arrangement of the first embedding block 2223 in the first embedding slot 2212. Specifically, the second guide surfaces 2224 may be inclined surfaces or cambered surfaces.

In an embodiment, an inner side wall, close to the receiving slot 244, of the first partition plate 222 protrudes to form a first reinforcing rib 2221, and an inner side wall, close to the receiving slot 244, of the second partition plate 221 protrudes to form a second reinforcing rib 2211. The strength of the first partition plate 222 and the strength of the second partition plate 221 can be improved through the first reinforcing rib 2221 and the second reinforcing rib 2211.

In an embodiment, both the first reinforcing rib 2221 and the second reinforcing rib 2211 are arranged in a lengthwise direction of the second opening 140. One end of the first reinforcing rib 2221 is connected to an inner wall of the bin body 240, and the other end protrudes out of the first partition plate 222 and is arranged in the second housing 241 when the first housing 242 is connected to the second housing 241. The second reinforcing rib 2211 and the first reinforcing rib 2221 are misaligned. One end of the second reinforcing rib 2211 is connected to the inner wall of the bin body 240, and the other end protrudes out of the second partition plate 221 and is arranged in the second housing 241 when the first housing 242 is connected to the second housing 241. By respectively arranging the protruding ends of the first reinforcing rib 2221 and the second reinforcing rib 2211 on the second partition plate 221 and the first partition plate 222, the strength of the integral partition plate 220 can be improved, and the strength of the connection between the first partition plate 222 and the second partition plate 221 can be conveniently improved.

In an embodiment, a third guide surface 2213 is formed at one end of a side wall, away from the bin body 240, of the first reinforcing rib 2221 and located on one side close to the first partition plate 222. Through the third guide surface 2213, it is convenient to arrange the first reinforcing rib 2221 protruding out of the first partition plate 222 on the second partition plate 221. A fourth guide surface 2222 is formed at one end of a side wall, away from the bin body 240, of the second reinforcing rib 2211 and located on one side close to the second partition plate 221. Through the fourth guide surface 2222, it is convenient to arrange the second reinforcing rib 2211 protruding out of the second partition plate 221 on the first partition plate 222. Specifically, both the third guide surface 2213 and the fourth guide surface 2222 can be inclined surfaces or cambered surfaces.

In the above embodiment, referring to FIG. 13 to FIG. 18, a sifter 260 located next to the integral partition plate 220 is arranged in the bin body 240. Therefore, when the litter bin 200 rotates, waste and pet litter can be first sifted through the sifter 260. The pet litter falls into the receiving slot 244 as the litter bin 200 continues to rotate. The waste is discharged along the integral partition plate 220 from the second opening 210 as the litter bin 200 continues to rotate, and the waste falls into the collection chamber 121 via the first opening 140.

Specifically, two end surfaces of the sifter 260 protrude outwards to form first insertion blocks 262. First insertion slots 2422 are formed in two internal end surfaces of the bin body 240. The first insertion blocks 262 are arranged in the first insertion slots 2422, so as to clamp and mount the sifter 260 in the bin body 240. The inner wall of the bin body 240 protrudes on one side of the notch of the receiving slot 244 to form a first limiting block 246. The sifter 260 is located between the first limiting block 246 and the integral partition plate 220. By cooperation between the first insertion blocks 262 and the first limiting block 246, the sifter 260 can be limited, so that the sifter 260 is prevented from rotating relative to the litter bin 200 when the litter bin 200 rotates, which affects the sifting effect on the waste and the pet litter.

In an embodiment, a second limiting block 261 is formed on a side wall, away from the first limiting block 246, of the sifter 260, and the second limiting block 261 is located on one side, away from the receiving slot 244, of the integral partition plate 220. By cooperation between the second limiting block 261 and the first limiting block 246, it is convenient to locate the sifter 260, and it is convenient to arrange the first insertion blocks 262 in the first insertion slots 2422. In other embodiments, the sifter 260 can also be arranged in the bin body 240 through a screws or another buckle form.

Figure 16:
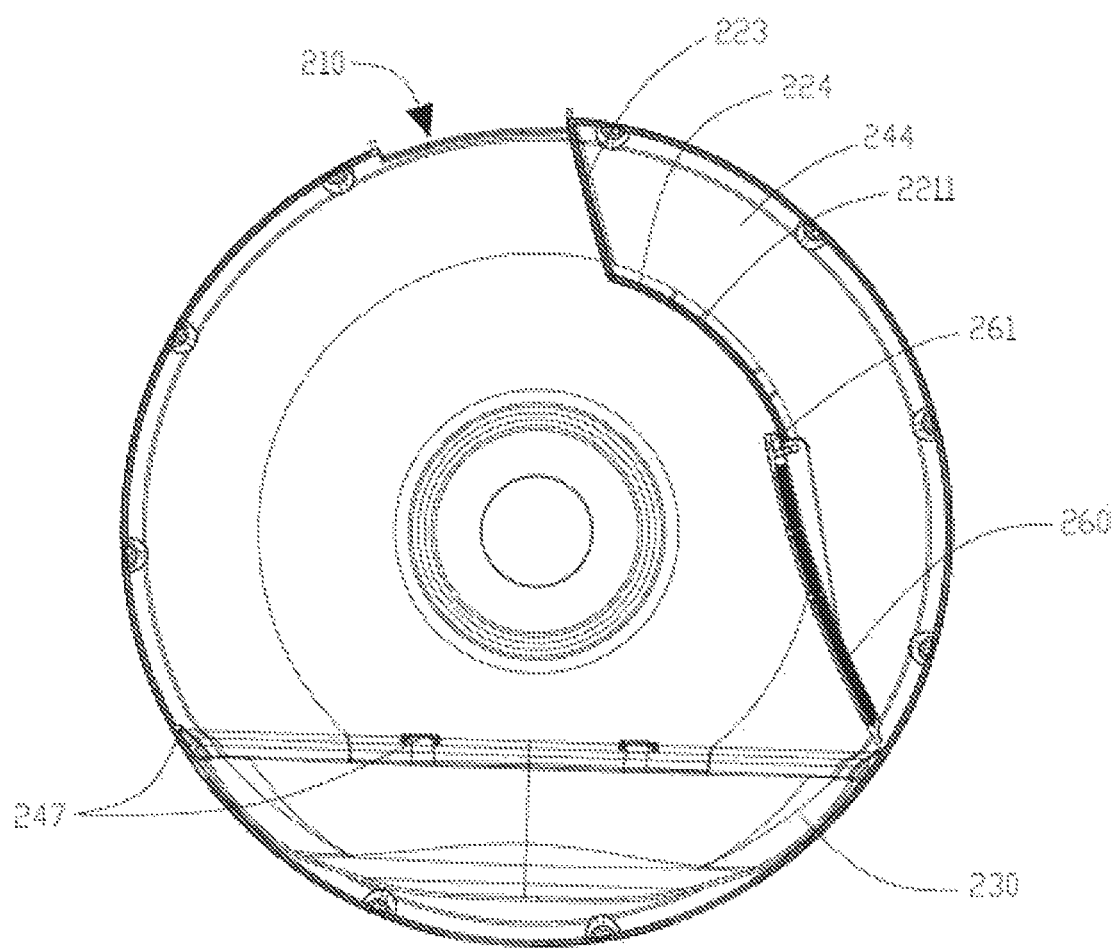
FIG. 16 is a cutaway view of a litter bin of the present disclosure along a junction line between a first housing and a second housing.
Figure 17:
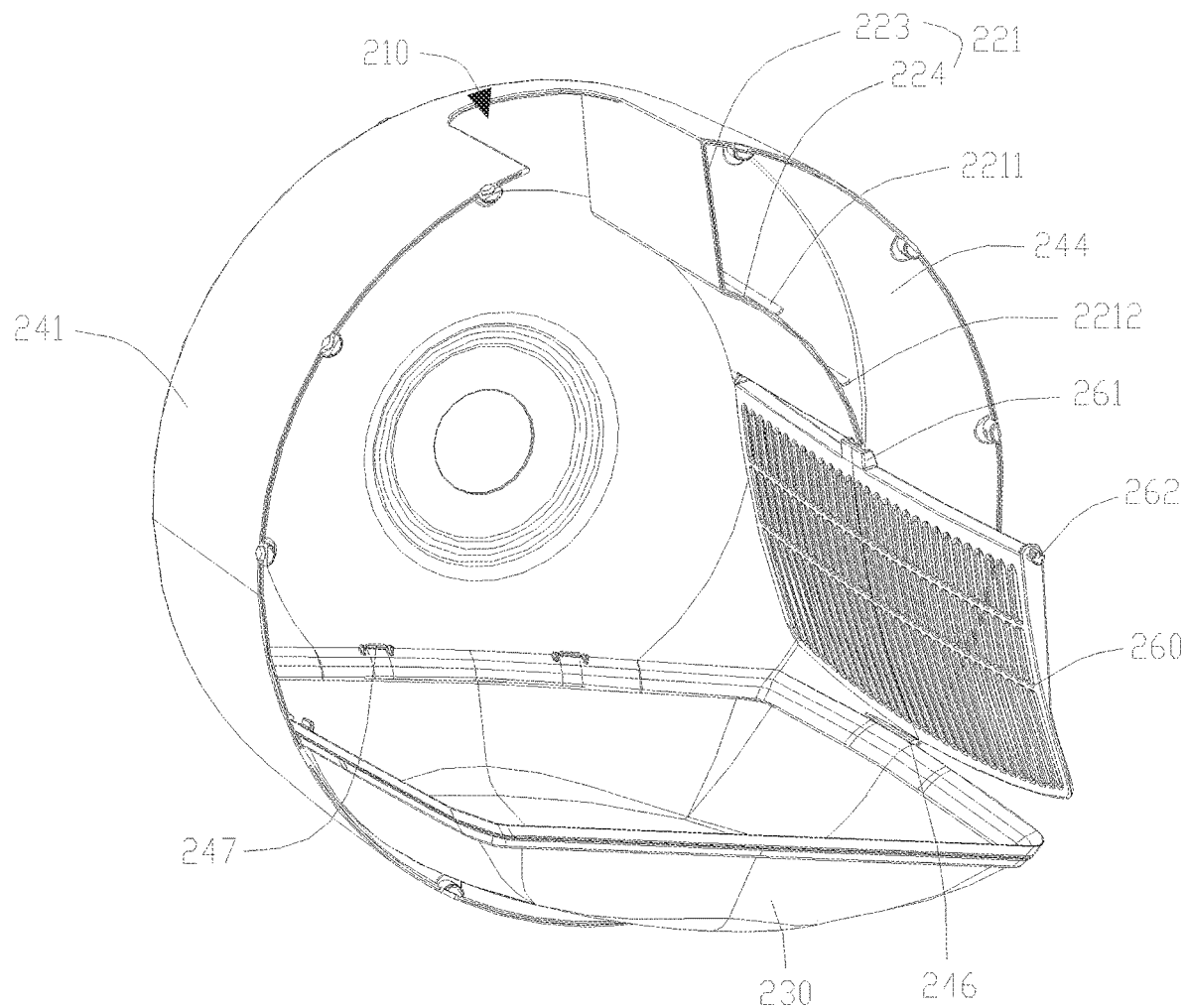
FIG. 17 is a structural diagram of removing a second housing from a litter bin of the present disclosure.
Figure 18:
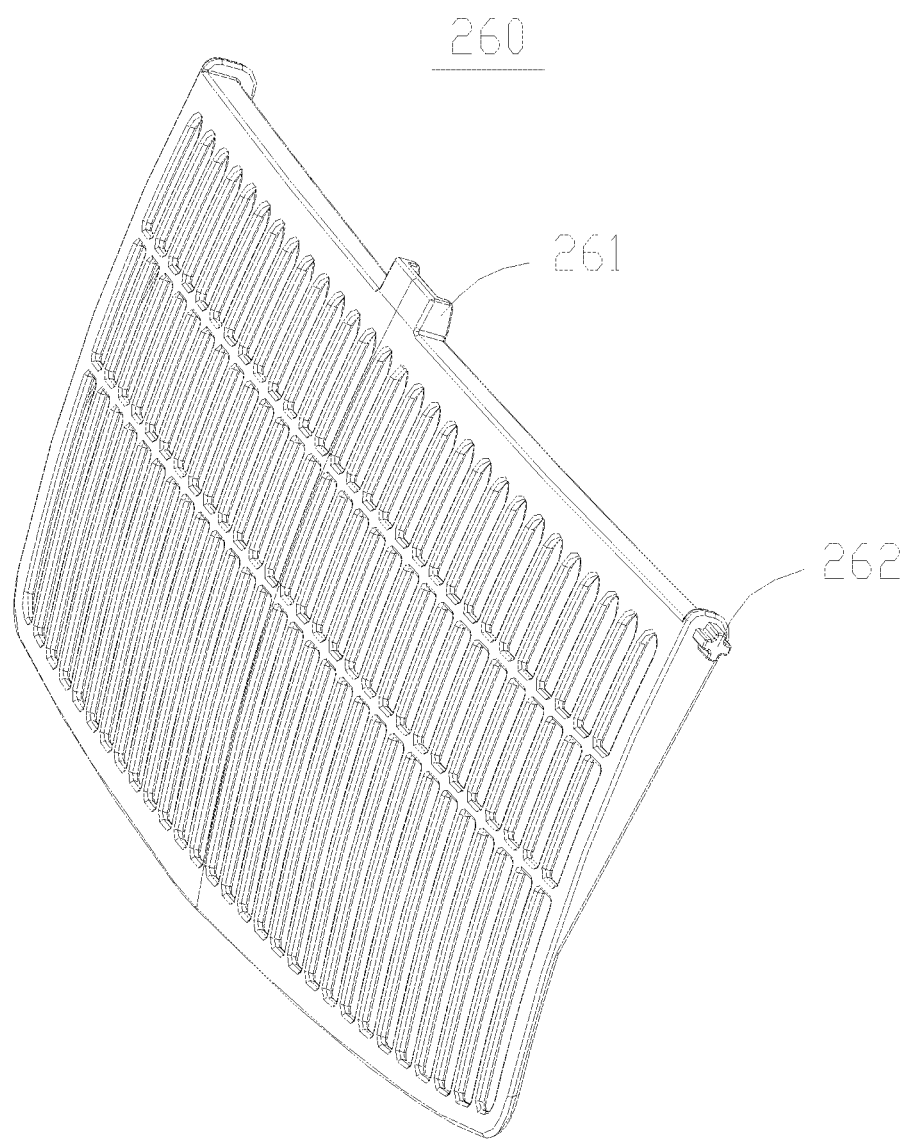
FIG. 18 is a structural diagram of a sifter of the present disclosure.

In an embodiment, referring to FIG. 16 and FIG. 17, the integral partition plate 220 includes a cambered surface section 224 located next to the sifter 260, and a guide section 223. It should be understood that the first partition plate 222 and the second partition plate 221 each include the cambered surface section 224 and the guide section 223. A side surface, away from the receiving slot 243, of the cambered surface section 224 is a cambered surface protruding relative to the side wall of the bin body 240. The guide section 223 extends from the cambered surface section to the second opening 210 of the bin body 240. The guide section 223 may be an inclined surface or a cambered surface. In this way, when the bin body 240 rotates, the waste is smoothly guided to the second opening 210 through the cambered surface section 224 and the guide section 223 along a rotating direction and is directly discharged out of the litter bin 200 via the second opening 210, which can effectively prevent the waste from being adhered to the integral partition plate 220, so as to better keep the litter bin 200 clean.

In an embodiment, a second joint structure is arranged between the first housing 242 and the second housing 241, so as to improve the stability of the connection between the first housing 242 and the second housing 241.

Specifically, the second joint structure includes a second embedding block 2423 and a second embedding slot 2417 used in conjunction with the second embedding block 2423. The second embedding block 2423 is arranged in the second embedding slot 2417 when the first housing 242 is connected to the second housing 241, so as to align the first housing 242 with the second housing 241, which facilitates locking screws subsequently. The stability of the connection between the first housing 242 and the second housing 241 can be improved. Specifically, the second embedding block 2423 is formed by protruding out of one side, opposite to the second housing 241, of the first housing 242, and the second embedding slot 2417 is located on the second housing 241. Or, the second embedding block 2423 is located in the second housing 241, and the second embedding slot 2417 is located on the first housing 242.

One side, close to the second housing 241, of the first housing 242 protrudes to form a plurality of first connecting lug seats 2421. One side, close to the first housing 242, of the second housing 241 protrudes to form a plurality of second connecting lug seats 2415. The first connecting lug seats 2421 are connected to the second connecting lug seats 2415 through screws, so as to fixedly connect the first housing 242 to the second housing 241. The second connecting lug seats 2415 are located on outer sides of the first connecting lug seats 2421. The second connecting lug seats 2415 are provided with counter bores 2416 in positions corresponding to the screws. Plugs 245 are arranged in the counter bores 2416. The screws can be hidden by the plugs 245, which improves the appearance of the pet toilet of this embodiment. Specifically, when one end of each screw passes through the corresponding counter bore 2416 and is arranged on the corresponding second connecting lug seat 2415, the screw does not pass through the second connecting lug seat 2415, which can prevent the pet litter from coming into contact with the screw and prevent rust on the screw from affecting the quality of the pet litter.

Figure 19:
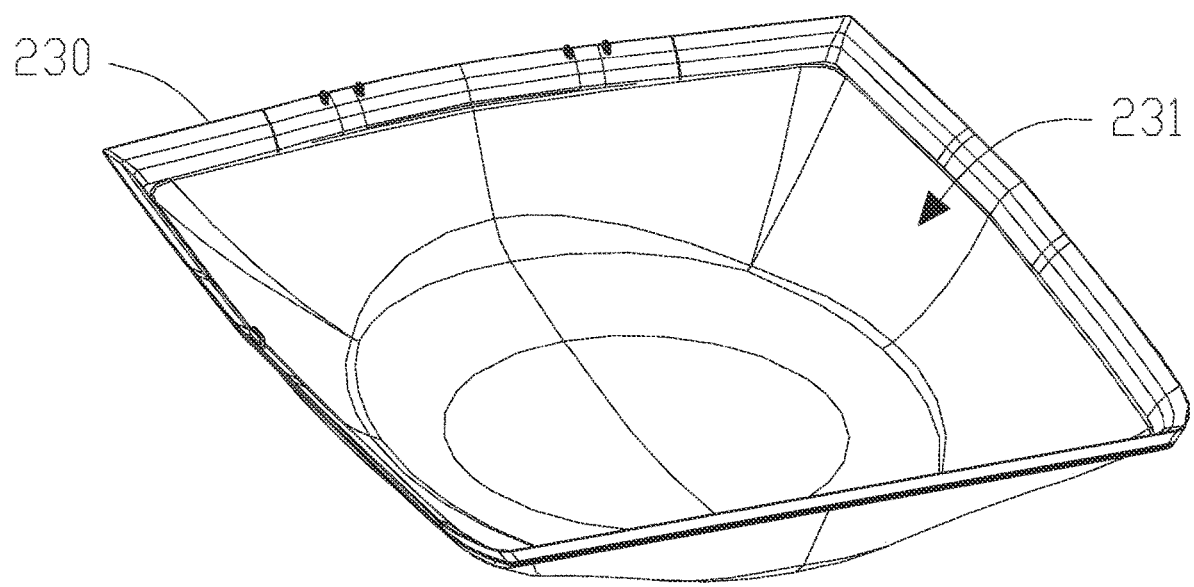
FIG. 19 is a structural diagram of a basin body of the present disclosure.

In an embodiment, referring to FIG. 17 and FIG. 19, the a removable basin body 230 provided with a third opening 231 in a top is arranged in the bin body 240. A circumferential side, located at the third opening 231, of the basin body 230 abuts against the inner wall of the bin body 240. The inner wall of the bin body 240 protrudes out of the circumferential side of the basin body 230 to form a plurality of clamping blocks 247 configured to limit the basin body 230. The clamping blocks 247 can limit the basin body 230, which prevents the basin body 230 from falling off during the rotation of the litter bin 200 to affect the use of the litter bin 200. Specifically, the first limiting block 246 is a clamping block 247. It should be understood that the first limiting block 246 configured to limit the sifter 260 is also configured to limit the basin body 230.

In an embodiment, a side wall, close to the third opening 231, of the basin body 230 inwards protrudes to form a cambered guide surface, which reduces blockage of the second limiting block 261 between the basin body 230 and the sifter 260 to the waste and the pet litter, so that it is convenient to guide the waste and the pet litter to the sifter 260 for sifting.

In this embodiment, referring to FIG. 1, in an initial state of the pet toilet, the basin body 230 is located at the bottom in the bin body 240; the second opening 210 is located at the top of the bin body 240; the sifter 260 and the integral partition plate 220 are located on a right side in the bin body 240 and are both located between the basin body 230 and the second opening 210. The sifter 260 is located below the integral partition plate 220. The notch of the receiving slot 244 is downward. At least one pushing member 250 is located on a right side of the first opening 140. At least one pushing member 250 is located on a left side of the first rack. The first rollers 131 are arranged in the concave groove 151, and the pet litter and the waste are located in the basin body 230.

Figure 4:
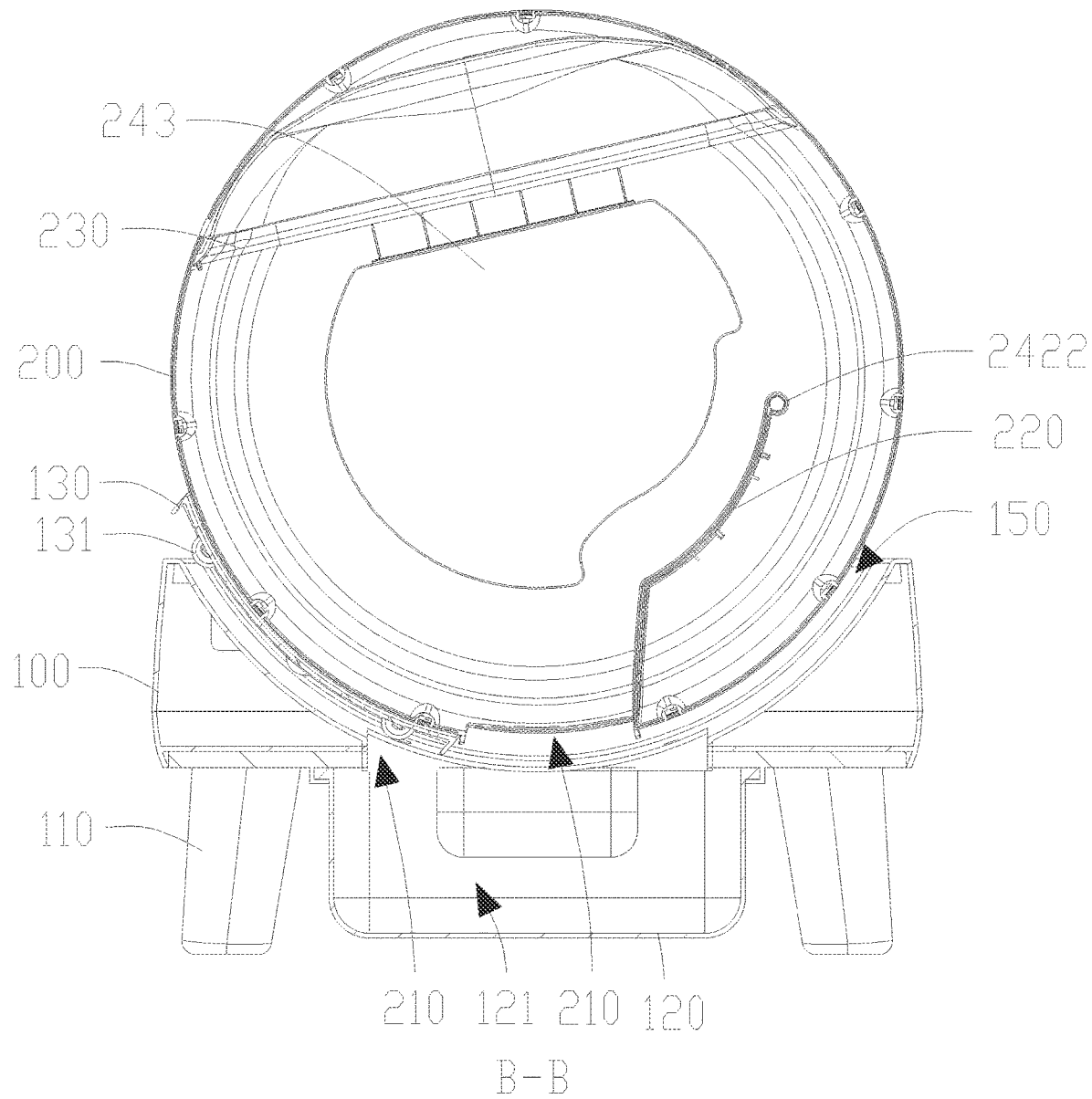
FIG. 4 is a cutaway view of the present disclosure along the direction B-B in FIG. 2.
Figure 5:
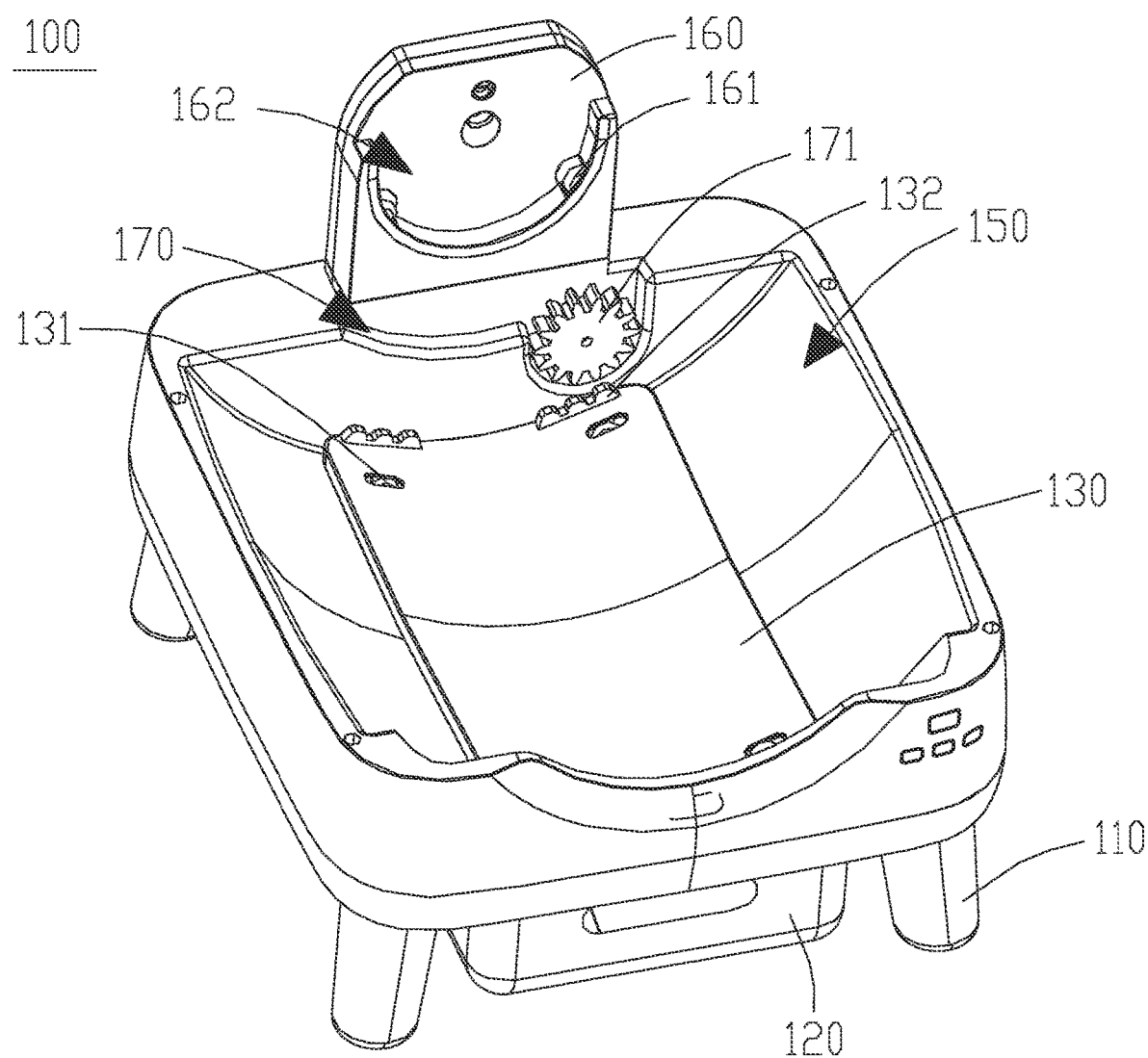
FIG. 5 is a schematic diagram of assembling of a base and a baffle plate of the present disclosure.

When the motor 190 drives the bin body 240 to rotate, and the pushing member 250 pushes the baffle plate 130 to move to be on a left side of the first opening 140, so as to fully open the first opening 140, the second opening 210 is located at the bottom of the bin body 240 and opposite to the first opening 140. As shown in FIG. 4, the sifter 260 and the integral partition plate 220 are located on a left side in the bin body 240; the sifter 260 is located above the integral partition plate 220; and the notch of the receiving slot 244 is upward. At least one pushing member 250 is located on the right side of the first opening 140. At least one pushing member 250 is located on the left side of the first rack. At least one pushing member 250 is located on the right side of the first rack. The pet litter is located in the receiving slot 244, and the waste falls into the collection chamber 121 through the second opening 210 and the first opening 140.

Figure 9:
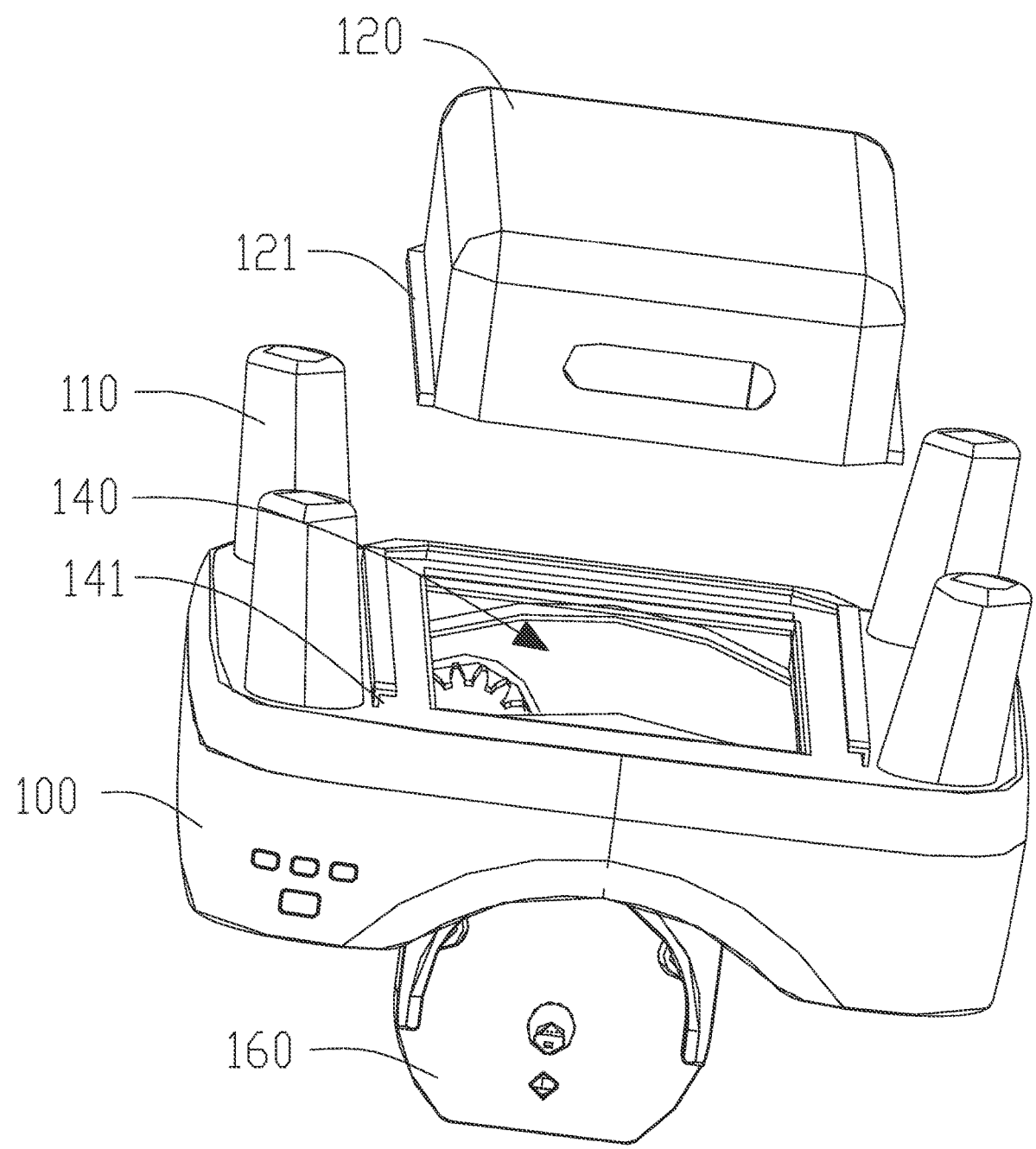
FIG. 9 is a partially exploded diagram of a base of the present disclosure.

In an embodiment, referring to FIG. 7 to FIG. 9, the bottom of the base 100 is detachably provided with a collection basin 120, and the collection chamber 121 is located on the collection basin 120. Thus, it is convenient to remove the collection basin 120 and facilitate a user to regularly clean the waste of the pet. Of course, in other embodiments, the collection chamber 121 can also be formed inside the base 100, and is used in cooperation with the first opening 140 to also store the waste of the pet.

Specifically, two sides of a top of the collection basin 120 outwards extend to form second insertion blocks 122. Sliding chutes 141 used in conjunction with the second insertion blocks 122 are formed in the bottom of the base 100. It should be understood that the sliding chutes 141 are located on two sides of the first opening 140. The second insertion blocks 122 are arranged in the sliding chutes 141, so that the collection basin 120 is mounted at the bottom of the base 100. Furthermore, when it is necessary to remove the collection basin 120, the collection basin 120 can be pulled out to facilitate use. In other embodiments, the collection basin 120 can also be removed by using buckles, hasps, or drawers.

In one embodiment, the bottom of the base 100 is further provided with a plurality of support legs 110 located on the circumferential side of the collection basin 120. A bottom surface of the collection basin 120 is located above bottom surfaces of the support legs 110, which can suspend the collection basin 120, reduce friction and scratches between the collection basin 120 and a placement plane of the pet toilet in this embodiment, and facilitate the removal of the collection basin 120.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A pet toilet, comprising a base, and a litter bin rotatably arranged on the base, wherein the base is provided with a collection chamber; a first opening is formed in a position, corresponding to the collection chamber, of the base; a baffle plate is movably arranged at the first opening of the base;
    the litter bin is provided with a first joint portion; the baffle plate is provided with a second joint portion used in conjunction with the first joint portion; the litter bin is provided with a pushing member;
    the baffle plate is configured to be pushed, when the litter bin rotates relative to the base, by the pushing member and is lifted upwards relative to the base in the pushing process; and the first joint portion is configured to be embedded with the second joint portion when the baffle plate is lifted upwards;
    wherein the base is provided with a driving mechanism connected to the litter bin and configured to drive the litter bin to rotate;
    wherein the litter bin is in a drum shape, and a rear end surface of the litter bin is provided with a first gear; an upper surface of the base is sunken downwards to form an avoiding groove that is matched with the litter bin; first supporting slots matched with the litter bin are formed in a front side wall and a rear side wall of the avoiding groove; the driving mechanism comprises a motor and a second gear connected to the motor; the second gear is located on the first supporting slot on the rear side wall of the avoiding groove; the second gear is engaged with the first gear; the litter bin rotates through the second gear when the motor drives the first gear to rotate;

the first joint portion is located on the rear end surface of the litter bin; the rear end surface of the litter bin protrudes backwards; and the second joint portion is located below the first gear and behind the rear end surface of the litter bin;

wherein the base is provided with a support plate behind the avoiding groove; a second supporting slot is formed in the support plate; a bottom surface of the second supporting slot is rotatably provided with a plurality of third rollers spaced apart from each other; a convex column is arranged on the rear end surface of the litter bin; the convex column is located in the middle of the first gear; an annular groove is formed in an outer side wall of the convex column; and some of the third rollers are arranged in the annular groove.

2. The pet toilet according to claim 1, wherein a surface of the base is inwards sunken to form a concave groove; and at least part of the baffle plate is arranged in the concave groove when the baffle plate is at an initial position.

3. The pet toilet according to claim 2, wherein a bottom of the baffle plate is rotatably provided with first rollers at two ends of the first opening, and at the initial position, at least part of each of the first rollers is arranged in the concave groove.

4. The pet toilet according to claim 3, wherein a side wall of the concave groove is a first guide surface.

5. The pet toilet according to claim 2, wherein the first joint portion is a first rack, and the second joint portion is a second rack; and the first rack is engaged with the second rack.

6. The pet toilet according to claim 1, wherein a second opening is formed in a side wall of the litter bin; there is one pushing member;

the pushing member is formed by protruding outwards from the rear end surface of the litter bin and is located at one end of the first joint portion; a side surface, away from the first gear, of the pushing member is located between the outer side wall of the litter bin and the side surface, away from the first gear, of the first joint portion; or, the pushing member is formed by protruding outwards from the side wall of the litter bin and is located next to the second opening.

7. The pet toilet according to claim 1, wherein there are a plurality of pushing members;

at least one pushing member is formed by protruding outwards from the rear end surface of the litter bin and is located at one end of the first joint portion, and a side surface, away from the first gear, of the pushing member is located between the outer side wall of the litter bin and the side surface, away from the first gear, of the first joint portion; and at least one pushing member is formed by protruding outwards from a side wall of the litter bin and is located next to the second opening.

8. The pet toilet according to claim 1, wherein a bottom surface of the first supporting slot located on the front side wall of the avoiding groove is rotatably provided with a plurality of second rollers spaced apart from each other.

9. The pet toilet according to claim 1, wherein the litter bin comprises a bin body and an integral partition plate arranged in the bin body; the first joint portion, the first gear, the pushing member, and the second opening are all located on the bin body; and the integral partition plate forms a receiving slot with an inner wall of the bin body and is integrally molded with the bin body.

10. The pet toilet according to claim 9, wherein the bin body comprises a first housing and a second housing connected to the first housing; the integral partition plate comprises a first partition plate integrally molded with the first housing, and a second partition plate integrally molded with the second housing; and the first partition plate and the second partition plate form the integral partition plate when the first housing is connected to the second housing.

11. The pet toilet according to claim 10, wherein a first joint structure is arranged between the first partition plate and the second partition plate.

12. The cat litter bin according to claim 10, wherein a sifter located next to the integral partition plate is further arranged in the bin body; two end surfaces of the sifter protrude outwards to form insertion blocks; insertion slots are formed in two internal end surfaces of the bin body; the insertion blocks are arranged in the insertion slots; the inner wall of the bin body protrudes on one side of the notch of the receiving slot to form a first limiting block; and the sifter is located between the first limiting block and the integral partition plate.

13. The pet toilet according to claim 12, wherein a removable basin body provided with a third opening in a top is arranged in the bin body; the inner wall of the bin body protrudes out of a circumferential side of the basin body to form a plurality of clamping blocks configured to limit the basin body; and the first limiting block is a clamping block.

14. The pet toilet according to claim 1, wherein a bottom of the base is detachably provided with a collection basin, and the collection chamber is located on the collection basin.

15. The pet toilet according to claim 14, wherein two sides of a top of the collection basin outwards extend to form second insertion blocks; sliding chutes used in conjunction with the insertion blocks are formed in the bottom of the base; and the second insertion blocks are arranged in the sliding chutes.

16. The pet toilet according to claim 15, wherein the bottom of the base is further provided with a plurality of support legs located on the circumferential side of the collection basin; and a bottom surface of the collection basin is located above bottom surfaces of the support legs.

17. A pet toilet, comprising a base, and a litter bin rotatably arranged on the base, wherein the base is provided with a collection chamber; a first opening is formed in a position, corresponding to the collection chamber, of the base; a baffle plate is movably arranged at the first opening of the base;

the litter bin is provided with a first joint portion; the baffle plate is provided with a second joint portion used in conjunction with the first joint portion; the litter bin is provided with a pushing member;

the baffle plate is configured to be pushed, when the litter bin rotates relative to the base, by the pushing member and is lifted upwards relative to the base in the pushing process; and the first joint portion is configured to be embedded with the second joint portion when the baffle plate is lifted upwards;

wherein the base is provided with a driving mechanism connected to the litter bin and configured to drive the litter bin to rotate;

wherein the litter bin is in a drum shape, and a rear end surface of the litter bin is provided with a first gear; an upper surface of the base is sunken downwards to form an avoiding groove that is matched with the litter bin; first supporting slots matched with the litter bin are formed in a front side wall and a rear side wall of the avoiding groove; the driving mechanism comprises a motor and a second gear connected to the motor; the second gear is located on the first supporting slot on the rear side wall of the avoiding groove; the second gear is engaged with the first gear; the litter bin rotates through the second gear when the motor drives the first gear to rotate;

the first joint portion is located on the rear end surface of the litter bin; the rear end surface of the litter bin protrudes backwards; and the second joint portion is located below the first gear and behind the rear end surface of the litter bin;

wherein the litter bin comprises a bin body and an integral partition plate arranged in the bin body; the first joint portion, the first gear, the pushing member, and the second opening are all located on the bin body; and the integral partition plate forms a receiving slot with an inner wall of the bin body and is integrally molded with the bin body;

wherein the bin body comprises a first housing and a second housing connected to the first housing; the integral partition plate comprises a first partition plate integrally molded with the first housing, and a second partition plate integrally molded with the second housing; and the first partition plate and the second partition plate form the integral partition plate when the first housing is connected to the second housing;

wherein a second joint structure is arranged between the first housing and the second housing; one side, close to the second housing, of the first housing protrudes to form a plurality of first connecting lug seats; one side, close to the first housing, of the second housing protrudes to form a plurality of second connecting lug seats; the first connecting lug seats are connected to the second connecting lug seats through screws; the second connecting lug seats are located on outer sides of the first connecting lug seats and are provided with counter bores in positions corresponding to the screws; and plugs are arranged in the counter bores.

\* \* \* \* \*